W. KENNEDY.
Bee Hive.
No. 43,211.
Patented June 21, 1864.
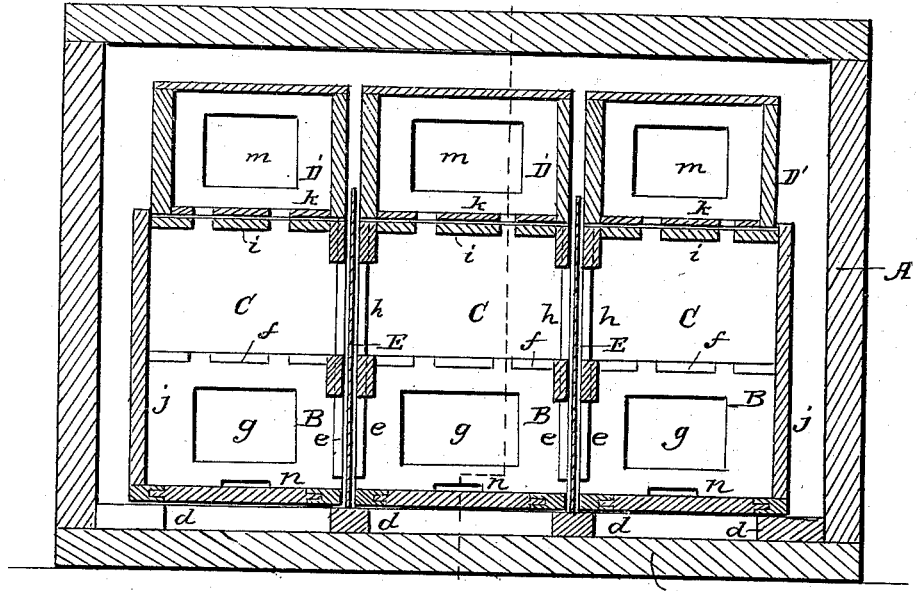
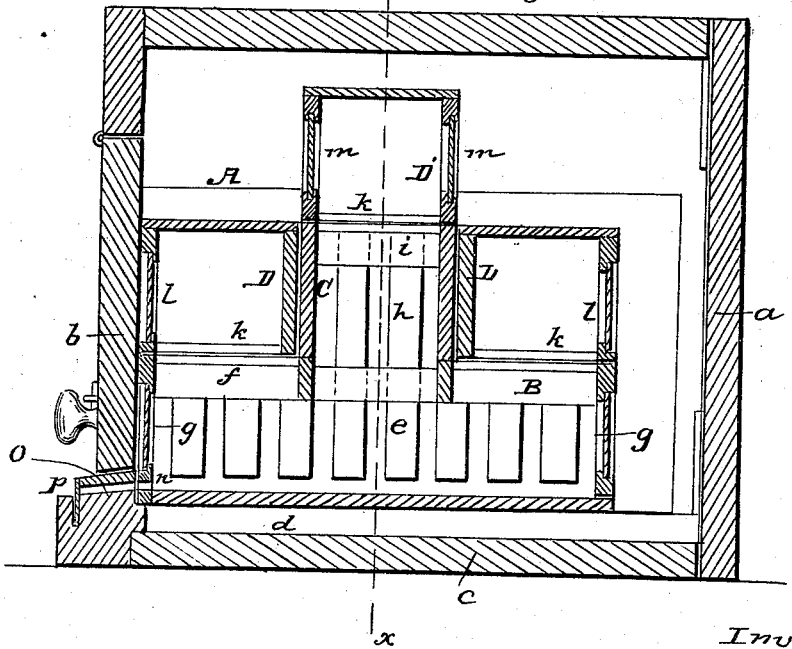
Witnesses:
J W Coombs.
G. W. Reed
Inventor:
W. Kennedy
per Munn & Co
Atty.

UNITED STATES PATENT OFFICE.

WASHINGTON KENNEDY, OF ROXBURY, NEW YORK.

IMPROVEMENT IN BEE-HIVES.

Specification forming part of Letters Patent No. 43,211, dated June 21, 1864.

*To all whom it may concern:*

Be it known that I, WASHINGTON KENNEDY, of Roxbury, in the county of Delaware and State of New York, have invented a new and Improved Bee-Hive or Bee-House; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate corresponding parts in the two figures.

This invention consists in the employment or use of a series of bee-compartments, constructed and arranged in a novel way, and in such a manner, within a house or case, that the bees may be confined to one apartment until more room is required, when they are admitted to another compartment, the whole being so devised that the parts are very accessible, old comb allowed to be removed, the bees prevented from swarming, spare honey readily removed, and the bees kept in a healthy state.

To enable those skilled in the art to fully understand and construct my invention, I will proceed to describe it.

A represents a rectangular box, which may be of any suitable dimensions, provided with a door, $a$, at its back end, and a door, $b$, at its front end. On the bottom $c$ of this box A there are permanently secured a series of cleats, $d$, at equal distances apart, on which boxes B rest. There are three of these boxes, (shown in Fig. 1,) placed side by side. They are of rectangular form, and each is provided with a central square (or nearly square) compartment, C, at its top. The central box B has both its sides formed of vertical slats $e$, and a longitudinally-slatted top, $f$, with a glass, $g$, in each end. The top compartment C has vertically-slatted sides $h$ and a slatted top, $i$, but its front and rear sides are solid. The two side boxes B are constructed precisely like the central one, and have their corresponding parts represented by similar letters, but the outer sides of said boxes are solid, as shown at $j$ in Fig. 1.

D D' represent smaller boxes, which have each a slatted bottom, $k$, but solid or clove sides and tops. The boxes D rest upon the slatted tops $f$ of the boxes B—one in front and one at the rear of each compartment C—and each of these boxes has a glass, $l$, in its outer side. The boxes D' rest upon the tops of the compartments C of the boxes B, and have a glass, $m$, in their front and rear sides.

In the front end of each box B, at the lower parts of the same, there is an oblong rectangular opening, $n$. These openings serve as bee-entrances, and they register or are in line with similar openings, $o$, at the lower part of the front side of the box A. The openings $o$ are provided each with a slide, $p$, by which the former may be closed when necessary.

From the above description it will be seen that by placing a slide, E, between the boxes B communication will be cut off between said boxes, and the bees confined to one box B, with its boxes D D D' upon it, and when these boxes become filled a slide, E, may be removed and the bees allowed to pass into the adjoining box B. By thus furnishing the bees additional room from time to time swarming will be prevented, and in case at any time a box should contain old comb, the box can be removed and the old comb taken out. The boxes D D' can be removed at any time, and the contents ("spare honey") taken out. The hive also can be kept perfectly clean, as any one or all of the boxes can be removed. The glasses at the ends of the boxes admit of the progress of the work being inspected from time to time.

I am aware that bee-hives have before been provided with movable partitions or sides, by means of which the bees could be confined within any desired parts of the lines. I am also aware that bee-houses have before been made to contain a number of hives, so as to prevent swarming.

The advantages of my peculiar construction and arrangement of hives communicating through slat partitions and separable at will are, that the entire hives may be cleansed, surplus honey removed, the moth excluded, and bees protected and wintered with better effect and more convenience than by any other devices within my knowledge.

Having thus fully described my invention, the following is what I claim as new therein and desire to secure by Letters Patent:

A series of removable boxes or hives, B B B, each provided with elevated central chambers, C, slat sides $h\ h$, slat tops $f\ i$, slides E E, and surplus-honey boxes D D D', the whole inclosed in a case, A $a\ b$, all as herein described, and for the purposes specified.

WASHINGTON KENNEDY.

Witnesses:
  JOHN E. NEWKIRK,
  HENRY T. MEEKER.